US009317309B2

(12) United States Patent
Walrath

(10) Patent No.: US 9,317,309 B2
(45) Date of Patent: Apr. 19, 2016

(54) VIRTUALIZED ENVIRONMENT ALLOCATION SYSTEM AND METHOD

(75) Inventor: Craig A. Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2686 days.

(21) Appl. No.: 11/646,903

(22) Filed: Dec. 28, 2006

(65) Prior Publication Data

US 2008/0163232 A1 Jul. 3, 2008

(51) Int. Cl.
*G06F 9/46* (2006.01)
*G06F 9/455* (2006.01)
*G06F 9/50* (2006.01)

(52) U.S. Cl.
CPC .......... *G06F 9/45533* (2013.01); *G06F 9/5011* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 5,572,694 A * | 11/1996 | Uchino | 718/1 |
| 6,802,062 B1 * | 10/2004 | Oyamada et al. | 718/1 |
| 6,892,261 B2 | 5/2005 | Ohno et al. | |
| 6,961,941 B1 | 11/2005 | Nelson et al. | |
| 6,996,828 B1 | 2/2006 | Kimura et al. | |
| 7,028,157 B2 * | 4/2006 | Block et al. | 711/173 |
| 7,039,922 B1 * | 5/2006 | Shah et al. | 719/326 |
| 7,254,813 B2 * | 8/2007 | Leong et al. | 718/104 |
| 7,657,675 B1 * | 2/2010 | Hoffman et al. | 710/60 |
| 7,685,401 B2 * | 3/2010 | Sugumar et al. | 711/203 |
| 7,945,652 B2 * | 5/2011 | Tsao et al. | 709/223 |
| 8,776,050 B2 * | 7/2014 | Plouffe et al. | 718/1 |
| 2001/0007112 A1 * | 7/2001 | Porterfield | 709/104 |
| 2002/0049869 A1 * | 4/2002 | Ohmura et al. | 710/5 |
| 2002/0108074 A1 * | 8/2002 | Shimooka et al. | 714/25 |
| 2002/0124040 A1 * | 9/2002 | Foster et al. | 709/100 |
| 2003/0014468 A1 * | 1/2003 | Sudhakaran et al. | 709/104 |
| 2004/0133721 A1 * | 7/2004 | Ellerbrock | 710/104 |
| 2004/0177193 A1 | 9/2004 | Ohno et al. | |
| 2004/0187106 A1 * | 9/2004 | Tanaka et al. | 718/1 |
| 2005/0149940 A1 * | 7/2005 | Calinescu et al. | 718/104 |
| 2005/0198633 A1 * | 9/2005 | Lantz et al. | 718/1 |
| 2005/0210158 A1 * | 9/2005 | Cowperthwaite et al. | 710/1 |
| 2005/0240932 A1 * | 10/2005 | Billau et al. | 718/104 |
| 2006/0064523 A1 * | 3/2006 | Moriki et al. | 710/62 |
| 2006/0069828 A1 * | 3/2006 | Goldsmith | 710/100 |

(Continued)

FOREIGN PATENT DOCUMENTS

| | | |
|---|---|---|
| JP | 63142451 | 6/1988 |
| JP | 01-093830 | 4/1989 |

(Continued)

OTHER PUBLICATIONS

International Search Report Dated May 19, 2008.

(Continued)

*Primary Examiner* — Emerson Puente
*Assistant Examiner* — Hiren Patel
(74) *Attorney, Agent, or Firm* — James L Baudino

(57) ABSTRACT

A virtualized environment allocation system comprises a computer system having a plurality of virtualized stacks, the computer system configured to have a plurality of input/output (I/O) devices coupled thereto, and an allocation controller configured to allocate at least one of the plurality of I/O devices to a first of the plurality of virtualized stacks and at least another of the plurality of I/O devices to a second of the plurality of virtualized stacks.

31 Claims, 2 Drawing Sheets

(56) References Cited

U.S. PATENT DOCUMENTS

| | | | |
|---|---|---|---|
| 2006/0143311 A1* | 6/2006 | Madukkarumukumana et al. | 710/1 |
| 2006/0195576 A1* | 8/2006 | Rinne et al. | 709/226 |
| 2006/0195673 A1* | 8/2006 | Arndt et al. | 711/173 |
| 2006/0259731 A1* | 11/2006 | Oshins et al. | 711/173 |
| 2007/0083862 A1* | 4/2007 | Wooldridge et al. | 718/1 |
| 2007/0106993 A1 | 5/2007 | Largman et al. | |
| 2007/0156968 A1* | 7/2007 | Madukkarumukumana et al. | 711/138 |
| 2008/0005297 A1 | 1/2008 | Kjos et al. | |
| 2008/0126579 A1* | 5/2008 | Corneli et al. | 710/5 |

FOREIGN PATENT DOCUMENTS

| | | |
|---|---|---|
| JP | 2006252565 | 9/2006 |
| WO | WO-03/081428 A2 | 10/2003 |

OTHER PUBLICATIONS

JP Notice of Rejection, Appln No. P2009-544031, date of dispatch Aug. 2, 2011, 2 p.

Translation of JP Notice of Rejection, Appln No. P2009-544031, date of dispatch Aug. 2, 2011, 2 p.

Subasi, et al.; "Performance improvement of dynamic buffered ATM switch", Computers & Electrical Engineering, vol. 31, No. 2, 2005.

Extended European Search Report, EP Application No. 07863045.6, Date: Dec. 23, 2010, pp. 1-7.

Guo-Liang Wu and Jon W. Mark, "A Buffer Allocation Scheme for ATM Networks: Complete Sharing Based on Virtual Partition," IEEE/ACM Transactions on Networking, Dec. 3, 1995, No. 6, New York, US, 1995, pp. 1-10, IEEE.

* cited by examiner

VIRTUALIZED ENVIRONMENT ALLOCATION SYSTEM AND METHOD

BACKGROUND

Virtualization creates a layer of abstraction between computer hardware and an operating system (OS) that enables multiple OSs to run simultaneously on the same computer system and multiple users to operate on the same computer system. Further, in some circumstances, virtualization also enables a single user to make use of multiple software stacks in the virtualized environment. Each manifestation of an OS generally has full access to all input/output (I/O) devices. Thus, in such virtualized environments, there is the likelihood of I/O device conflicts between different OSs and between different software stacks that are under the control of a particular user.

BRIEF DESCRIPTION OF THE DRAWINGS

For a more complete understanding of the present invention, the objects and advantages thereof, reference is now made to the following descriptions taken in conjunction with the accompanying drawings, in which.

DETAILED DESCRIPTION OF THE DRAWINGS

Figure 1:
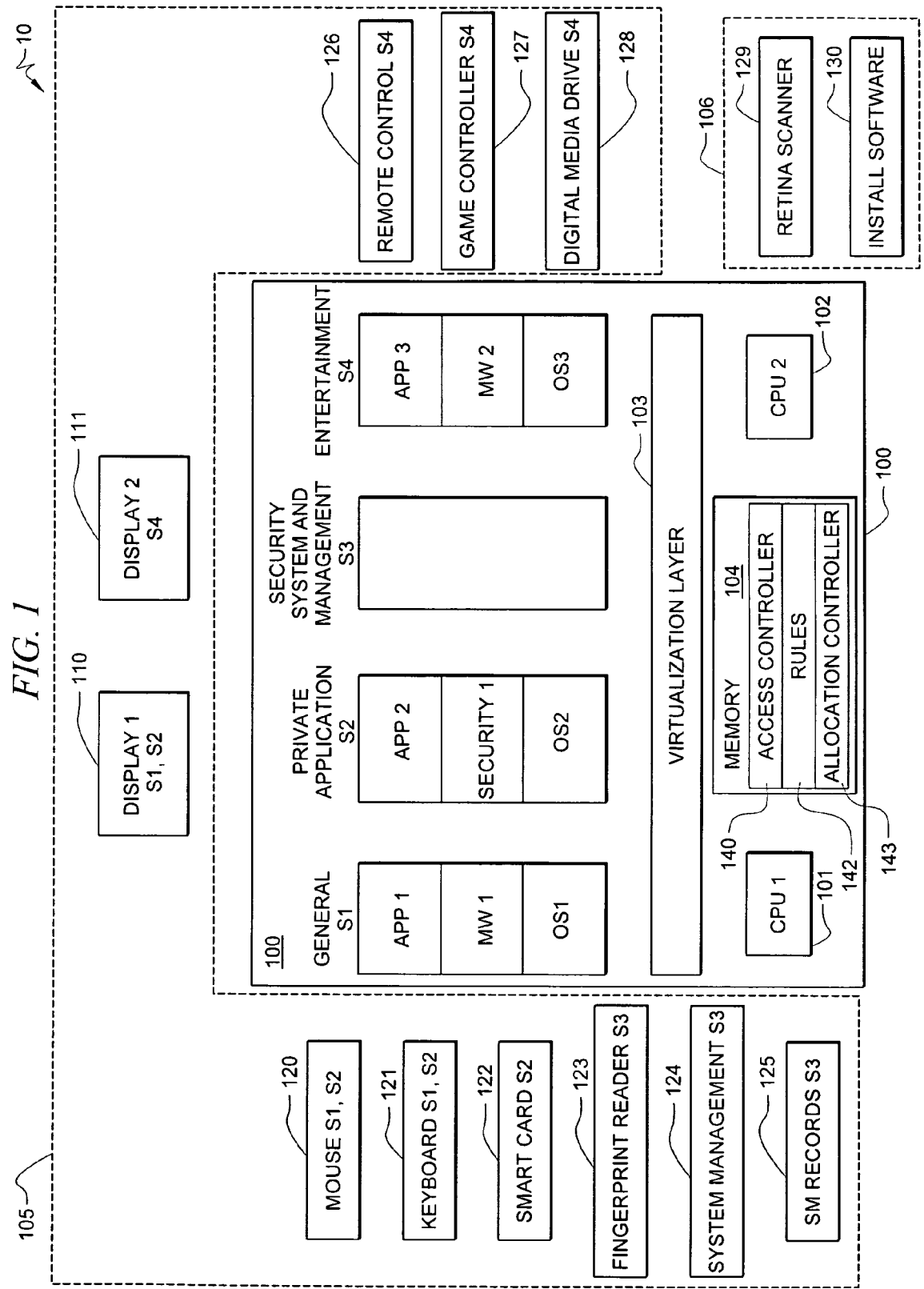
FIG. 1 is a block diagram illustrating an embodiment of a virtualized environment allocation system.
Figure 2:
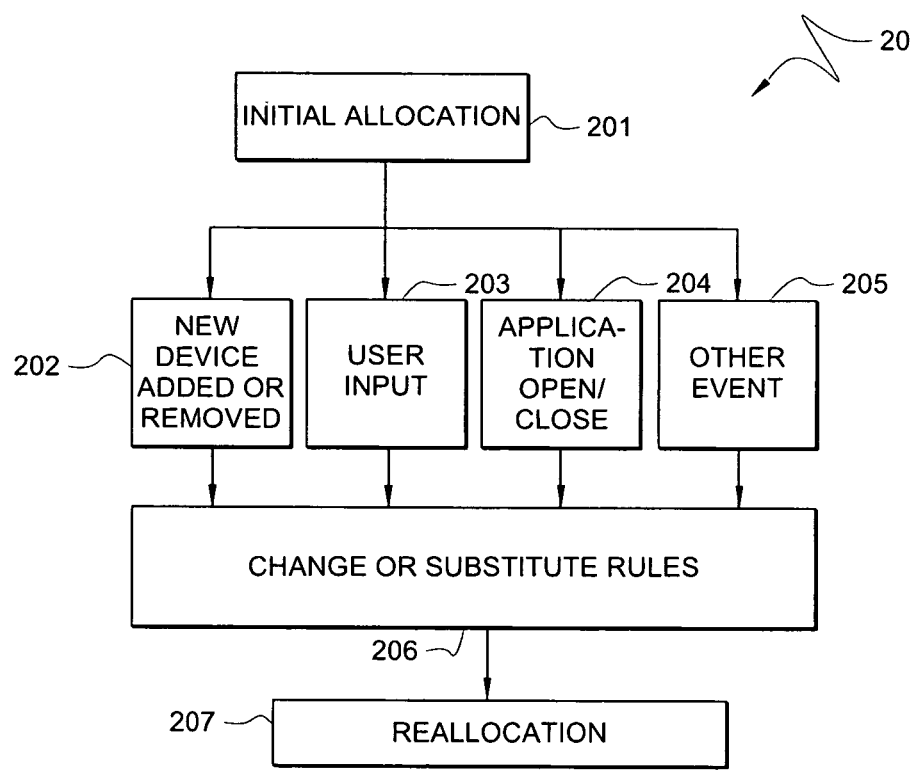
FIG. 2 is a flow diagram illustrating an embodiment of a virtualized environment allocation method.

The preferred embodiments of the present invention and the advantages thereof are best understood by referring to FIGS. 1 and 2 of the drawings, like numerals being used for like and corresponding parts of the various drawings.

FIG. 1 is a block diagram illustrating an embodiment of virtualized environment allocation system 10. In the embodiment illustrated in FIG. 1, system 10 comprises a computer system 100 having input/output (I/O) devices 105 communicatively coupled thereto. In the embodiment illustrated in FIG. 1, I/O devices 105 comprise displays 110 and 111, a mouse 120, a keyboard 121, a smartcard reader 122, a fingerprint reader 123, a system management (SM) system 124, SM records 125, a remote control 126, a game controller 127, and a digital media drive 128. However, it should be understood that I/O devices 105 may comprise additional and/or different types of devices such as, but not limited to, a universal serial bus (USB) device, a camera, a microphone, a biometric device, a printer, a scanner, a geospatial positioning system (GPS) receiver, a communication device and an audio/video device. Further, it should be understood that the quantity of I/O device 105 coupled to computer system 100 may be varied.

In FIG. 1, computer system 100 employs two central processing units (CPUs) 101 and 102, although a greater or fewer quantity of CPUs may be used. Computer system 100 also comprises a virtualization layer 103 which comprises a software layer of abstraction between CPUs 101 and 102 and four exemplary stacks S1-S4. Preferably, each stack S1-S4 comprises hardware, software, firmware, or a combination thereof, managed as an integrated solution or component. In the embodiment illustrated in FIG. 1, stack S1 comprises a general purpose application stack, stack S2 comprises a private application stack for running financial programs or for processing process medical or other sensitive information, stack S3 comprises a security and system management stack for running security- and management-related processes, and stack S4 comprises an entertainment stack for operating entertainment-related programs and processes. Thus, in FIG. 1, stacks S1-S4 are configured and/or otherwise dedicated for different uses and/or functions. However, it should be understood that stacks S1-S4 may comprise other types of stacks, and it should be understood that the quantity of stacks may be otherwise varied. Further, it should be understood that stacks S1-S4 may be assigned to a single user or multiple users (e.g., some stacks assigned to one user while others are assigned to a different user).

In the embodiment illustrated in FIG. 1, stack S1 comprises an operating system (OS) OS1, middleware (MW) MW1, and an application APP1. Stack S2 comprises an OS OS2 (which may be different than or the same as OS1 running in stack S1) and a security layer SECURITY1 disposed between OS1 and an application APP2. Stack S3 is illustrated in FIG. 1 as not running an OS, because it may run a more basic security service. However, it should be understood that in some embodiments, stack S3 may run an OS. Stack S4 comprises an OS OS3, which, in some embodiments, comprises an abbreviated OS for running only entertainment-related applications. Stack S4 also comprises MW MW2 and an entertainment application APP3, which may be a game or media player.

In the embodiment illustrated in FIG. 1, mouse 120, keyboard 122, and display 110 are allocated to stack S1. Further, in FIG. 1, as a result of an increased level of security generally desired for some private applications, smartcard reader 122 is assigned to stack S2. However, it should be understood that any applications run in stack S2 may also require the use of a mouse, keyboard and display. Thus, in FIG. 1, mouse 120, keyboard 121 and display 110 are also allocated to stack S2. In the embodiment illustrated in FIG. 1, stack S3 is allocated fingerprint reader 123, SM 124, and SM records 125. It should be understood that security and system management could be run on separate stacks. In FIG. 1, remote control 126 and game controller 127 are allocated to stack S4. It should be understood that other stacks may be provided, either as a duplication of stacks S1-S4 or other types of stacks based on other functions and uses. Additionally, in a multi-CPU system as illustrated in FIG. 1 (e.g., CPUs 101 and 102), particular stacks may be associated with specific CPUs.

In FIG. 1, computer system 100 also comprises a memory 104 storing an access controller 140, prioritization rules 142, and an allocation controller 143. Access controller 140 and allocation controller 143 may comprise hardware, software, firmware, or a combination thereof, and may comprises a computer program embodied on a computer-readable medium. Access controller 140 is used for limiting user access to certain features of computer system 10, such as limiting the ability of a user to affect changes in prioritization rules 142 and allocation controller 143. For example, access could be limited such that only a user with proper login credentials could make changes to prioritization rules 142 and allocation controller 143. The login credentials could be basic user credentials or reserved privileges, such as super user privileges or computer administrator privileges. Allocation controller 143 identifies and/or otherwise determines I/O devices 105 coupled to computer system 100 and allocates I/O devices 105 to the various stacks S1-S4. Allocation controller 143 may be part of virtualization layer 103 and/or one or more of operating systems OS1-OS3 in stacks S1-S4 or an overall operating system for computer system 100.

Prioritization rules 142 are a list of rules used by allocation controller 140 for assigning various ones of I/O devices 105 to stacks S1-S4 while computer system 10 is operating or when booting up. In some embodiments, prioritization rules 142 comprise default settings which may be automatically applied when computer system 100 boots and/or when a new I/O device is connected to computer system 100. For example, in some embodiments, a default setting may indicate that all newly added devices (e.g., device 106) are added to stack S1 unless they have a security function or are related to game control. Thus, for example, if a user adds a new biometric reading device, such as a retina scanner 129, installation software 130 that accompanies device 129 may update prioritization rules 142 to indicate that allocation controller 140 should allocate scanner 129 to stack S3 because retina scanner 129 is a security-related device. Alternatively, allocation controller 140 may prompt a user to categorize new device 106 during installation and/or may automatically recognize and/or categorize the newly added device for allocation. Thus, for example, in response to receiving user input, possibly received by allocation controller 140 through mouse 120 or keyboard 121, allocation controller 140 may automatically apply default prioritization rules 142 to allocate scanner 129 to security stack S3. However, in some embodiments, a user may use allocation controller 140 to enter a different allocation so that allocation controller 140 allocates device 106 to another stack, such as stack S1, S2 or S4, or multiple stacks. It should also be understood that installation software 130 and/or prioritization rules 142 may indicate that certain types of devices 105 be allocated to multiple stacks.

In some embodiments, prioritization rules 142 comprise contingencies such as, but not limited to, indicating allocation of certain ones of I/O devices 105 to stack S4 when application APP3 starts running but to stack S1 when APP3 closes. Another possible contingent allocation rule could be that smart card reader 122 is normally allocated to stack S2 until fingerprint reader 123 is detached from computer system 100, at which time smart card reader 122 is reallocated to stack S3. Further, reconnecting fingerprint reader 123 to computer system 100 could trigger allocation controller 140 to reallocate smart card reader 122 to stack S2.

Further, in some embodiments, rules 142 are hierarchical such that the allocation of certain ones of I/O devices 105 is contingent upon the allocation of other ones of I/O devices 105 or upon which stacks are running. For example, stacks themselves may have priorities, such as stack S3 having a priority for security devices. With such a stack priority scheme, at least one security-related device from I/O devices 105 would be allocated to stack S3, if stack S3 was running, and S2 would only have a security-related device if stack S3 was not running. Thus, in this example, stack S2 could then have priority for security-related devices over stacks S1 and S4 so that if stack S3 was not running, stack S2 would be allocated at least one security-related device from I/O devices 105.

In some embodiments, rules 142 are organized into groups or sets such that a group or set of rules 142 is used to control allocation of I/O devices 105 for different circumstances and, therefore, may be amended and/or replaced/substituted as a set. Thus, for example, prioritization rules 142 may comprise multiple sets, wherein allocation controller 143 uses one set as a current or default set, and in response to a certain event occurring, replaces the current set with another stored set of rules 142 (i.e., uses a different set of rules 142), thereby providing dynamic allocation and/or reallocation. Events could include the addition of new device 106 or removal/disconnection of one of I/O devices 105, user input, or the starting or closing of application APP2. In some embodiments, different sets of rules 142 are based on a particular use for computer system 100 (e.g., if computer system 100 is to be used for gaming, a particular set of rules 142 is used for allocating I/O devices 105). Substitution and/or replacement of one or a set of rules 142 may be temporary (e.g., so that when conditions change, a prior-used set of rules is reestablished as the current set) or permanent (e.g., where the prior set of rules 142 is discarded or not used again unless directed to do so by user input or otherwise). In some embodiments, substitution of rules 142 triggers a reallocation in which allocation controller 143 reallocates I/O devices 105 to specific ones of stacks S1-S4 based on newly-modified or a replacing set of prioritization rules 142. However, it should be understood that in some embodiments, reallocation may require restarting computer system 100 to use new prioritization rules 142.

FIG. 2 is a flow diagram illustrating an embodiment of a virtualized environment allocation method 20. The method begins at block 201 where initial I/O device 105 allocation is performed by allocation controller 143. For example, in some embodiments, allocation controller 143 accesses rules 142 and allocates I/O devices 105 based on rules 142. In some embodiments, different events trigger allocation and/or reallocation of I/O devices 105 to particular and/or different stacks. For example, at block 202, the addition or removal of one or more I/O devices 105 relative to computer system 100 is detected. At block 203 user input is received (e.g., categorizing and/or re-categorizing a particular I/O device 105 or a particular function). At block 204, the opening or closing of an application is detected. For example, if application APP3 is a movie player, and remote control 126 is initially assigned to entertainment stack S4, then the termination of application APP3 (e.g., indicating the end of the movie), triggers reallocation of remote control 126 to general stack S1 where it could be used for controlling APP1.

Other events may also trigger allocation and/or reallocation of I/O devices 105 in some embodiments, as indicated at bock 205. Other events may comprise a timer firing, a scheduled event, an external system administrator sending and update request, various sensors sending signals such as environmental or tampering indications, a user login, a hypervisor request and an OS request. An event may optionally trigger a change or substitution of prioritization rules 142 as indicated at optional block 206. For example, prioritization rules 142 may include rules indicating that keyboard 121 and display 110 are allocated to both general stack S1 and private application stack S2, while game controller 127 and display 111 are allocated to entertainment stack S4. However, upon removal of game controller 127, allocation control 143 may prompt a user to select from a set of choices which govern changes to rules 142 (e.g., perhaps the user no longer wishes to use the computer for games, in which case no devices will be allocated to stack S4, or perhaps the user needs to use keyboard input to control games, in which case keyboard 121 will be further allocated to stacks S4).

At block 207, in response to detecting one or more events (e.g., the events indicating at blocks 202-205) allocation controller 143 allocates and/or reallocates one or more I/O devices 105 to particular and/or different stacks. Thus, embodiments of system 10 enable I/O devices 105 to be allocated to one or more stacks in a virtualized environment based on, for example, different uses and functions of the particular I/O devices 105 and/or different uses and/or functions of the computer system 100 in connection with the particular I/O device 105 is used.

What is claimed is:
1. A virtualized environment allocation system, comprising:

a computer system having a plurality of virtualized stacks, the computer system configured to have a plurality of input/output (I/O) devices coupled thereto; and an allocation controller configured to allocate, according to at least one rule, at least one of the plurality of I/O devices to a first of the plurality of virtualized stacks and at least another of the plurality of I/O devices to a second of the plurality of virtualized stacks, wherein the at least one rule specifies allocation of a particular one of the plurality of I/O device; and wherein the allocation controller is further configured to reallocate, according to the at least one rule, the at least one I/O device to another virtualized stack in response to a give I/O device being connected to the computer system, wherein the at least one rule specifies that the at least one I/O device is to be allocated to the first virtualized stack unless the given I/O device is connected to the computer system.

2. The system of claim 1, wherein the allocation controller is configured to dynamically allocate the plurality of I/O devices to the plurality of virtualized stacks.

3. The system of claim 1, further comprising a set of prioritization rules accessible by the allocation controller for determining which of the plurality of I/O devices should be allocated to which of the plurality of virtualized stacks, wherein the at least one rule is part of the set.

4. The system of claim 1, wherein the allocation controller is configured to reallocate the at least one I/O device to another virtualized stack in response to an event.

5. The system of claim 1, wherein the allocation controller is configured to allocate the at least one I/O device to the first virtualized stack based on a function of the first virtualized stack.

6. The system of claim 1, wherein the allocation controller is configured to allocate at leas tone of the plurality of I/O devices to at least one of the plurality of virtualized stacks based on prioritization among the plurality of virtualized stacks.

7. The system of claim 1, wherein allocation of the at least another I/O device is contingent upon the allocation of the at least one I/O device.

8. The system of claim 1, wherein the allocation controller is configured to reallocate, according to the at least one rule, the at least one I/O device to another virtualized stack in response to opening of an application on the computer system, wherein the at least one rule specifies that the at least one I/O device is to be allocated to the first virtualized stack unless the application is opened.

9. The system of claim 1, wherein the allocation controller is configured to reallocate, according to the at least one rule, the at least one I/O device to another virtualized stack in response to closing of an application on the computer system, wherein the at least one rule specifies that the at least one I/O device is to be allocated to the first virtualized stack unless the application is closed.

10. The system of claim 1, wherein the allocation controller is configured to reallocated the at least one I/O device to another virtualized stack in response to a given I/O device being disconnected from the computer system, wherein the at least one rule specifies that the at least one I/O device is to be allocated to the first virtualized stack unless the given I/O device is disconnected from the computer system.

11. The system of claim 1, wherein the at least one rule specifies allocation of the particular I/O device to the first virtualized stack if the particular I/O device has a first function, and the at least one rule specifies allocation of the particular I/O device to the second virtualized stack if the particular I/O device has a second, different function.

12. The system of claim 1, wherein the allocation controller is part of the computer system.

13. The system of claim 1, wherein the at least one rule specifies allocation of the at least another of the plurality of I/O devices is to be allocated to the second virtualized stack if a particular component is present in the system, and to specify allocation of the at least another of the plurality of I/O devices to a different one of the plurality of virtualized stacks if the particular component is not present in the system.

14. The system of claim 1, wherein the at least one rule specifies allocation of the at least another of the plurality of I/O devices to the second virtualized stack in response to an application running in the system, and to specify allocation of the at least another of the plurality of I/O devices to a different one of the plurality of virtualized stacks if the application is not running in the system.

15. The system of claim 1, wherein the at least one rule specifies allocation of the at least one I/O device to the first virtualized stack if the first virtualized stack is running, and the at least one rule further specifies allocation of the at least one I/O device to a different one of the virtualized stacks if the first virtualized stack is not running.

16. A virtualized environment allocation method, comprising:

identifying a plurality of input/output (I/O) devices coupled to a computer system, the computer system having a plurality of virtualized stacks;

allocating, according to at least one rule, at least one of the plurality of I/O devices to a first of the plurality of virtualized stacks and at least another of the plurality of I/O devices to a second of the plurality of virtualized stacks, wherein the at least one rule specifies allocation of a particular one of the plurality of I/O devices to a selected one of the plurality of virtualized stacks based on a function of the particular I/O device; and reallocating, according to the at least one rule, the at least one I/O device to another virtualized stack in response to a given I/O device being connected to the computer system, wherein the at least one rule specifies that the at least one I/O device is to be allocated to the first virtualized stack unless the given I/O device is connected to the computer system.

17. The method of claim 16, further comprising dynamically allocating the plurality of I/O devices to the plurality of virtualized stacks.

18. The method of claim 16, further comprising accessing a set of prioritization rules for determining which of the plurality of I/O devices should be allocated to which set of the plurality of virtualized stacks, wherein the at least one rule is part of the set.

19. The method of claim 16, further comprising reallocating, according to the at least one rule, the at least one I/O device to another virtualized stack in response to an event, wherein the at least one rule specifies allocation of the at least one I/O device to the first virtualized stack unless the event occurs.

20. The method of claim 16, further comprising allocating the at least one I/O device to the first virtualized stack based on a function of the first virtualized stack.

21. The method of claim 16, further comprising allocating the at least one of the plurality of I/O devices to at least one of the plurality of virtualized stacks based on prioritization among the plurality of virtualized stacks.

22. The method of claim 16, further comprising allocating the at least another I/O device based on the allocation of the at least one I/O device.

23. The method of claim 16, further comprising reallocating, according to the at least one rule, the at least one I/O device to another virtualized stack in response to opening of an application on the computer system, wherein the at least one rule specifies that the at least one I/O device is to be allocated to the first virtualized stack unless the application is opened.

24. The method of claim 16, further comprising reallocating, according to the at least one rule, the at least one I/O device to another virtualized stack in response to closing of an application on the computer system, wherein the at least one rule specifies that the at least one I/O device is to be allocated to the first virtualized stack unless the application is closed.

25. The method of claim 16, further comprising reallocating, according to the at least one rule, the at least one I/O device to another virtualized stack in response to a given I/O device being disconnected from the computer system, wherein the at least one rule specifies that the at least one I/O device is to be allocated to the first virtualized stack unless the given I/O device is disconnected from the computer system.

26. A virtualized environment allocation system, comprising:
at least one central processing unit (CPU); and
an allocation controller executable on the at least one CPU to allocate at least a first one of a plurality of I/O devices to a first of a plurality of virtualized stacks of a computer and at least a second one of the plurality of I/O devices to a second of the plurality of virtualized stacks, wherein the allocation controller is executable to further determine a function of the first one of the plurality of I/O devices and allocate the first one of the plurality of I/O devices to the first of the plurality of virtualized stacks based on the determined function of the first one of the plurality of I/O devices; and
wherein the allocation controller is executable to further reallocate the first 11O device from the first virtualized stack to another of the virtualized stacks in response to 10 detecting addition or removal of a component in the computer.

27. The system of claim 26, wherein the allocation controller is executable to dynamically allocate the plurality of I/O devices to the plurality of virtualized stacks.

28. The system of claim 26, wherein the allocation controller is executable to further identify a prioritization among the plurality of virtualized stacks for allocating at least one of the plurality of I/O devices thereto.

29. The system of claim 26, wherein the allocation controller is executable to control allocation of the plurality of I/O devices among the plurality of virtualized stacks according to at least one rule, wherein the at least one rule specifies allocation of a particular one of the I/O devices to a selected one of the plurality of virtualized stacks based on a function of the particular I/O device.

30. A non-transitory computer-readable medium having stored thereon an instruction set to be executed, the instruction set, when executed by a processor, causes the processor to:
determine a function of at least a first one of a plurality of I/O devices;
allocate the first one of the plurality of I/O devices to a first of a plurality of virtualized stacks of a computer system based on the determined function of the first one of the plurality of I/O devices and at least a second one of the plurality of I/O devices to a second of the plurality of virtualized stacks; and
reallocate the first I/O device from the first virtualized stack to another of the virtualized stacks in response to detecting addition or removal of a component in the computer system.

31. The computer-readable medium of claim 30, wherein the instruction set, when executed by the processor, causes the processor to dynamically allocate the plurality of I/O devices to the plurality of virtualized stacks.

* * * * *